US006942807B1

(12) United States Patent (10) Patent No.: US 6,942,807 B1
Meng et al. (45) Date of Patent: Sep. 13, 2005

(54) IRON POWDER AND SAND FILTRATION PROCESS FOR TREATMENT OF WATER CONTAMINATED WITH HEAVY METALS AND ORGANIC COMPOUNDS

(75) Inventors: Xiaoguang Meng, Highland Park, NJ (US); George P. Korfiatis, Basking Ridge, NJ (US)

(73) Assignee: Trustees of Stevens Institute of Technology, Hoboken, NJ (US)

( * ) Notice: Subject to any disclaimer, the term of this patent is extended or adjusted under 35 U.S.C. 154(b) by 318 days.

(21) Appl. No.: 10/049,107

(22) PCT Filed: Jun. 28, 2000

(86) PCT No.: PCT/US00/17693

§ 371 (c)(1),
(2), (4) Date: Jul. 1, 2002

(87) PCT Pub. No.: WO01/10786

PCT Pub. Date: Feb. 15, 2001

Related U.S. Application Data

(60) Provisional application No. 60/147,708, filed on Aug. 6, 1999.

(51) Int. Cl.$^7$ .............................. C02F 1/52; C02F 1/62; C02F 1/70; C02F 9/02; B01D 24/02
(52) U.S. Cl. ...................... 210/719; 210/720; 210/738; 210/748; 210/757; 210/202; 210/206; 210/912; 210/913; 210/205
(58) Field of Search ................................ 210/719, 720, 210/738, 748, 757, 202, 205, 206, 912, 913

(56) References Cited

U.S. PATENT DOCUMENTS 3,511,488 A * 5/1970 Stubblefield ................. 266/170
4,152,143 A    5/1979 Kausel et al.
4,201,573 A    5/1980 Nissen
4,303,441 A   12/1981 Lamisse
4,422,943 A * 12/1983 Fender et al. ................ 210/716
4,724,084 A    2/1988 Pahmeier et al.
5,403,490 A *  4/1995 Desai ........................... 210/652
5,660,733 A *  8/1997 Deskins ....................... 210/712

OTHER PUBLICATIONS

John F. Martin et al., "Demonstration of Microfiltration Technology", J. Waste Management Association, 1991, vol. 41., No. 12, pp. 1653-1657.
Andre Dupont; "Lime Treatment of Liquid Waste Containing Heavy Metals, Radionuclides and Organics, National Conference on Management of Uncontrolled Hazardous Waste Sites", 7th edition, Production Engineering, Apr. 1997, pp. 84-88. 57.
L.E. Eary et al., "Chromate Removal from Aqueous Wastes by Reduction with Ferrous Ion", Environ Sci. Technol., 1988, vol. 22, No. 8, 1988, pp. 972-977.
Robert C. Cheng et al., "Enhanced Coagulation for Arsenic Removal", J. Awwa, 1994, Vol 86(9), pp. 79-90.
Mark M. Benjamin et al., "Metals Treatment as Superfund Sites by Adsorptive Filtration", EPA/540/R-93/515.
D. Jarog et al., "Adsoprtion and Filtration with Oxide-Coated Granular Activated Carbon", American Chemical Society Meeting, Apr. 5-10, 1992; pp. 711-714.
Marc Edwards et al., "Adsorptive Filtration Using Coated Sand: A New Approach for Treatment of Metal-Bearing Wastes", Journal WPCF, 1989, vol. 61, No. 6, pp. 1523-1533.

(Continued)

Primary Examiner—Thomas M. Lithgow
(74) Attorney, Agent, or Firm—McCarter & English, LLP

(57) ABSTRACT

A water filtration device (3) and method which removes heavy metals and organic compounds from raw water is provided.

17 Claims, 2 Drawing Sheets

OTHER PUBLICATIONS

W. Y. Chen et al., "Recovery and Recycle of Metals From Wastewater With a Magnetite-Based Adsorption Process", Research Journal WPCF, 1991, vol. 63, No. 7, pp. 958-964.

Dimitris Dermatas et al., "Removal of Arsenic Down to Trace Levels by Adsorptive Filtration", 2nd Specialized Conference on Pretreatment of Industrial Wastewaters, 1996, pp. 191-198.

Gordon P. Treweek, "Optimization of Flocculation Time Prior to Direct Filtration", Journal AWWA, 1979, pp. 96-100.

Michael R. Collins, et al., "Evaluation of Factors Affecting Performance of Direct Filtration", J. Environ. Eng., 1987, vol. 113 (2), pp. 330-334.

John R. Bratby, "Optimizing Manganese Removal and Washwater Recovery at a Direct Filtration Plant in Brazil", J. Awwa, 1988, pp. 71-81.

Xiaoguang Meng, "Effect of Component Oxide Interaction on the Absorption Properties of Mixed Oxides", Ph. D. Thesis, Department on Civil and Environmental Engineering, Syracuse University, 1993.

* cited by examiner

IRON POWDER AND SAND FILTRATION PROCESS FOR TREATMENT OF WATER CONTAMINATED WITH HEAVY METALS AND ORGANIC COMPOUNDS

BACKGROUND OF THE INVENTION

Zero valent iron is an effective and economic reagent for removal of heavy metals and for destruction of chlorinated organic compounds in water because of its high reduction potential. It is known that zero valent iron can be used to recover copper, silver and mercury in water by electrochemical reduction or iron concentration (Case, O. P. 1974. In: *Metallic Recovery from Waste Waters Utilizing Cementation.* EPA-670/2-74-008, 9–23; Gold, J. P. et al. 1984. *WPCF* 56:280–286). Other heavy metals such as lead, nickel, cadmium, chromium, arsenic, and selenium can also be removed from water using iron by reduction and precipitation (U.S. Pat. Nos. 4,565,633; 4,405,464). Uranyl ($UO_2^{+2}$) and pertechnetate ($TcO_4^-$) can be effectively removed by iron through reductive precipitation (Cantrell, K. J. et al. 1995. *J. Hazard. Mater.* 42:201–212). Zero valent iron has also been used to remediate nitrate-contaminated water (Zawaideh, L. I. and T. C. Zhang. 1998. *Wat. Sci. Tech.* 38:107–115). Iron is also known to be effective for dechlorination of toxic organic compounds such as carbon tetrachloride and trichloroethylene (Gilham, R. W. and S. F. O'Hannesin. 1994. *Groundwater* 32:985–967; Helland, B. R. et al. 1995. *J. Hazard. Mater.* 41:205–216).

Zero valent iron in powder, granular, and fibrous forms can be used in batch reactors, column filters, and permeable reactive barriers installed in groundwater aquifers for water treatment and metals recovery. However, iron particles in a filter rapidly fuse into a mass due to formation of iron oxides and deposition of the heavy metals. This fusion significantly reduces the hydraulic conductivity of the iron bed. To solve this problem, a mixture of iron and inert material such as sand has been used in filter columns (Shokes, T. E. and G. Moller. 1999. *Environ. Sci. Technol.* 33:282–287). The mixed bed cannot be backwashed because iron and sand will be separated into different layers. Stirrers, rotating discs, and revolving drum reactors have been tested to keep the iron in motion in order to prevent the fusion of iron particles (Strickland, P. H. and F. Lawson. 1971. *Proc. Aust. Inst. Min. Met.* 236:71–79; Fisher, W. 1986. *Hydrometallurgy* 16:55–67). However, the mixing processes reduce the effectiveness of iron filters and increase wear of the reactors. A fluidized bed column has been developed to remove copper from highly acidic wastewater (U.S. Pat. No. 5,133,873). This process requires utilization of high flow rate and very fine iron powder (i.e., 200 to 950 micrometers) in the filter.

Conventional treatment processes for removal of organic compounds and heavy metals from water are generally based on chemical precipitation and coagulation followed by conventional sand filtration (Dupont, A. 1986. *Lime Treatment of Liquid Waste Containing Heavy Metals, Radionuclides and Organics,* 7th edition, Washington D.C., pp. 306–312; Eary, L. E. and D. Rai. 1988. *Environ. Sci. Technol.* 22:972–977; Cheng, R. C. et al. 1994. *J. AWWA* 86:79–90). Sand filtration alone is not effective in removing heavy metals, especially arsenic and chromate, mainly because sand filter media have a low sorptive capacity for heavy metals. However, if the sand surface of the filter is coated with iron or aluminum hydroxide, the adsorption capacity of the filter media can be significantly enhanced (Meng, X. G. 1993. *Effect of Component Oxide Interaction on the Adsorption Properties of Mixed Oxides,* Ph.D. Thesis, Department of Civil and Environmental Engineering, Syracuse University, Syracuse, N.Y.).

In column studies, research has shown that cationic metals (Cu, Cd, Zn and Pb) can be removed effectively by sand and granular activated carbon coated with ferric oxide (Benjamin, M. 1992. *Metal Treatment at Superfund Sites by Adsorptive Filtration,* EPA/540/F-92/008; Jarog, D. et al. 1992. *Adsorption and Filtration with Oxide-Coated Granular Activated Carbon,* ACS Meeting, San Francisco, Calif., pp. 711–714; Edwards, M. and M. Benjamin. 1989. *J. Water Pollut. Control Fed.* 61:1523–1533). However, during these processes, sand and activated carbon have to be coated periodically prior to their placement in the filter. Further, the adsorptive capacity of the ferric oxide coating is much lower than that of fresh ferric hydroxide precipitate.

Microfiltration (Martin, J. F. et al. 1991. *J. Air Waste Manage. Assoc.* 41:1653–1657) and adsorption and magnetic filtration (Chen, W. Y. et al. 1991. *Res. J. Water Pollut. Control Fed.* 63:958–964) have also been studied as means of removing heavy metals from water. The microfiltration process includes precipitation and filtration in two steps. The main difference between this process and the traditional precipitation and filtration treatment is that the heavy metal precipitates are removed directly through a membrane filter, eliminating the coagulation step. In the adsorption and magnetic filtration process, heavy metals are adsorbed onto fine magnetic particles coated with ferrihydrite. The magnetic particles are then collected using a magnetic filter. Finally, the magnetic particles are regenerated by metal desorption and then reused.

Dermatas and Meng (1996. *Removal of Arsenic Down to Trace Levels by Adsorptive Filtration,* 2nd Specialized Conference on Pretreatment of Industrial Wastewaters, Athens, Greece, pp. 191–198) tested an adsorptive filtration process for selective removal of arsenic from water. The process involved injection of ferric solution into the top layer of the sand bed or within the sand filter. The stipulated mechanism responsible for removal of arsenic is the coating of sand surfaces with ferric precipitate and subsequent adsorption of arsenic. A direct filtration process has been used for the treatment of source water (G. P. Treweek, J. AWWA, February, 96–100 (1979); M. R. Collins, et al, J. Environ. Eng., 113(2), 330–344. (1987); J. R. Bratby, J. AWWA, December, 71–81 (1988)). The direct filtration process included addition of coagulants to the water followed by flocculation and filtration. A flocculation time or hydraulic detention time of longer than 10 minutes was needed which requires the installation of a large flocculation reactor prior to the sand filter.

A water filtration device has now been developed for removal of heavy metals and organic compounds, such as pesticides, from drinking water, waste water and soil washing solutions. The process for filtering water via this device is based on use of a vibrating iron bed filter and a sand filter.

SUMMARY OF THE INVENTION

The present invention is a water filtration device for removal of heavy metals and organic compounds from contaminated drinking water, waste water and soil treatment solutions. The device comprises at least one iron filter connected in series to a sand filter. Removal of contaminants from water is enhanced by the application of a source of vibratory energy and/or an auger system to the iron filter. The auger system may be used either in place of or in conjunction with the vibratory energy source. Oxidizers and coagulants may be mixed with the water after passage through the iron filter and before passage through the sand filter to increase efficiency of contaminant removal from water. Also provided are methods for removal of heavy metals and organic compounds from raw water using a water filtration device of the present invention.

Another object of the present invention is a water filtration device for removal of heavy metals and organic compounds from contaminated water that employs on-line addition of iron solution with an in-line injection port and a sand filter or multi-media filter, thereby eliminating the use of an iron filter. This system can be used for treatment of water containing low levels of heavy metals. Iron solution is added upstream of the sand filter to form a co-precipitate with the contaminants. The co-precipitate is removed directly by the sand filter.

DETAILED DESCRIPTION OF THE INVENTION

The present invention is a water filtration device which comprises a continuously or intermittently vibrated iron bed filter or filters and a sand filter. In this device, the fusion of iron particles in the filter, a drawback to previous iron filters, is prevented by continuous or intermittent vibration with an external or internal source of vibratory energy or by continuous mixing with an auger. Most of the water pollutants are removed by the iron filter or filters. The residual pollutants in the iron filter effluent are further precipitated with ferric ions generated by corrosion of iron particles and oxidation. The precipitates are removed directly by the sand filter. The iron filter can also be eliminated from the system to form a direct co-precipitation filtration process for the treatment of water containing low levels of contaminants.

Figure 1:
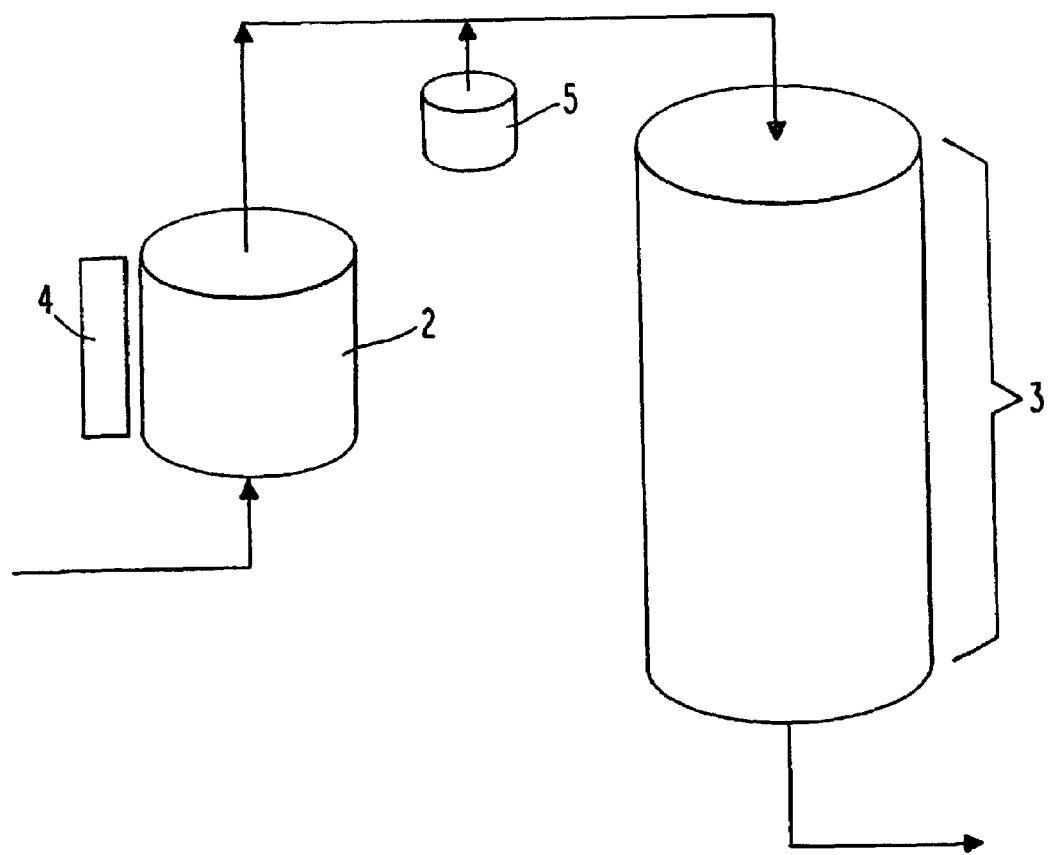
FIG. 1 provides a schematic of one embodiment of a water filtration device of the present invention wherein the iron filter is subjected to vibration via an external source.

In a preferred embodiment, the device of the present invention consists of at least two filters in series, an iron filter 2 and a sand bed filter 3, as shown in FIG. 1. A device which comprises two or more iron filters and one or more sand filters in series can also be used. In one embodiment, water for filtration is first collected in a container. Alternatively, the filtration device of the present invention can be placed directly on line with a water supply source. The water to be filtered via the device of the present invention is contaminated with heavy metals and/or organic compounds that are harmful to human health and is commonly referred to as "raw water". Examples of heavy metals and organic compounds which often contaminate the water include, but are not limited to, arsenic, chromium, nickel, selenium, lead, cadmium, copper, PCBs, chlorinated organic compounds and pesticides. The raw water is passed through the iron filter which comprises iron filings or particles. The size of these particles can vary from fine powder to large granules and chips depending on the type of contaminant and water flow rate. The chemical processes that take place within the iron filter (depending on the types of contaminants in the raw water) include reduction, precipitation, adsorption, dechlorination, and combinations thereof. Since the incoming raw water generally contains dissolved oxygen, up to saturation level of 8 mg/L, oxidation of the iron surface takes place immediately. Such oxidation fuses the iron particles into a monolithic structure, reducing the hydraulic permeability and rendering the iron filter useless in a matter of hours or days. The fusion of iron particles is therefore prevented in the instant invention by three different methods involving applying a vibratory source 4 to the iron filter 2.

In one embodiment, a source of vibratory energy 4 is applied to the granular iron. The vibration is applied either continuously or intermittently. The vibrations keep the iron particle in motion and thus prevent the cementation of the matrix by oxide formation. The frequency and the magnitude of the vibrations applied depends on the filter size, the type of granular iron used, and the types and concentration of contaminants present in the water, and can vary from low frequencies to ultrasonic frequencies. The vibrations can be applied either externally as depicted in FIG. 1 (i.e., applying vibration on the filter housing with a commercially available vibrator) or internally directly on the iron powder with a vibratory probe. In order to increase the distribution of vibration energy within the iron bed, a set of ribs or baffles can be added to the vibratory probe. A combination of externally and internally applied vibration can also be used.

In another embodiment of the present invention, applied vibration is used to regenerate the iron filter. The vibration frees the iron precipitates which are formed during the oxidation process and the finer particulates are carried by the water to the sand filter where they are retained and recovered during backwashing. In addition to vibration, an augering system which is embedded in the iron and slowly circulates the iron can be used. The number and size of the augers required depends upon the size of the filter, where augering, like vibration keeps the iron filter continuously regenerating.

In yet another embodiment, a combination of both vibration and circulation via an auger is employed. In this embodiment, the core shaft of the auger consists of a vibratory probe and the combination of vibration and circulation provides an improved separation of iron particles within the filter.

During the filtration treatment, small of amounts of iron filings and granular iron can be added into the vibrating iron filter, continuously or intermittently to maintain sufficient reactivity of the iron bed. The iron bed can also be replaced partially or completely when its reactivity decreases to a desirable level. Chemicals such as acids, bases, and oxidizing and reducing reagents such as ozone or hydrogen peroxide can be added to the water before it flows into the vibrating iron filter. The addition of the chemicals can control the reactivity of the iron bed and improve the removal and destruction of contaminants.

In yet another embodiment, on-line addition of iron solution and a sand filter can be used for the treatment of water which contains only low levels, in the order of less than 1 ppm, of heavy metals. In this embodiment, the iron solution is added to the water upstream of the sand filter to form a co-precipitate with the contaminants. These co-precipitates are then removed directly by passage of the water through the sand filter.

Figure 2:
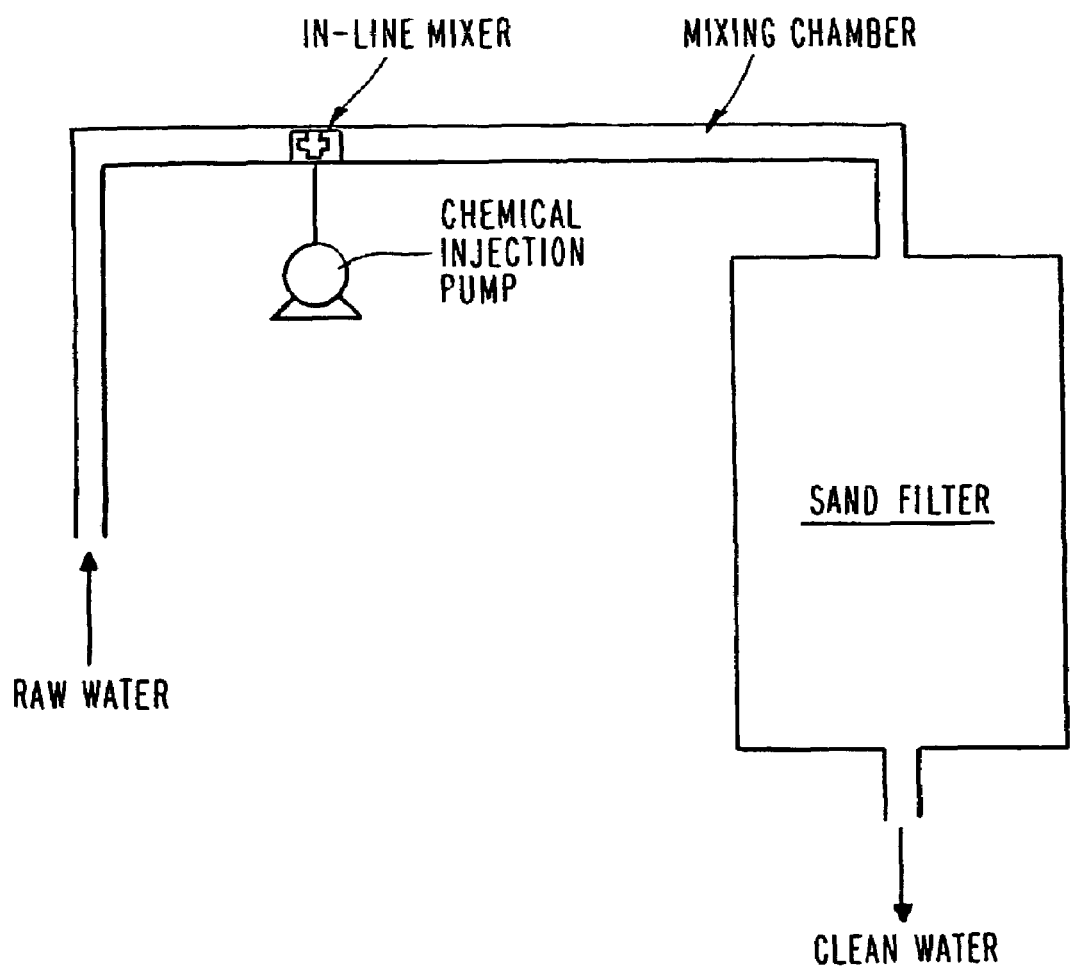
FIG. 2 depicts a process diagram for in-line injection. In this process, contaminated water enters the inflow, passes to an in-line mixer, mixing chamber and sand filter, and emerges as treated water.

The sand filter 3 of the present invention is located downstream of the iron filter 2. The sand filter has a dual function in that it facilitates precipitation of contaminants that are not removed in the iron filter, such as heavy metals, and it acts as a particulate filter cleaning the water from any produced solids. For example, small amounts of ferrous ions are released from the iron particles due to corrosion. Ferrous ions in the effluent coming out of the iron filter are oxidized by dissolved oxygen and form ferric hydroxide precipitate. At the same time, residual heavy metals in the effluent form co-precipitates with ferric hydroxide rapidly and are removed by the sand filter. The process continues until the permeability of the sand filter is reduced. This is detected by a pressure drop across the filter. The pressure is automatically monitored and when it exceeds a specified value the sand filter undergoes a backwash cycle by reversing the water flow as is done in conventional filter backwashing procedures. In one embodiment where only low levels of heavy metal contaminants are expected to be found in the water to be treated, the iron filter 2 can be eliminated from the system to form a direct co-precipitation filtration process. The direct coprecipitation filtration process eliminates the iron filter in the iron powder-sand filter system (FIG. 1). Ferric solution and other chemicals such oxidants and coagulants are added into the water pipe and other water distribution systems directly or through an on-line mixer, or through other device such as an injection port. The injection port is located upstream of the sand filter 3 so that the chemicals can mix with the water and convert the contaminants from soluble to particulate form before the water enters the sand filter bed 3. A conventional in-line mixer can be used to enhance the mixing process. Therefore, this distance between the injection port and the sand filter is a chamber for mixing of the water and the iron solution in order to form a co-precipitate. Subsequently, the co-precipitate particles are removed by the sand filter. In FIG. 2, a process diagram for in-line injection is provided.

A direct co-precipitation filtration process has lower costs and less total area requirements for the treatment process. It eliminates the need for flocculation reactor(s) that are usually required in the direct filtration process.

In some cases, additional oxidizers, such as potassium permanganate and chlorite salts, or coagulants, such as iron chloride and iron sulfate, are used to achieve complete removal of target contaminants from water. These coagulants and oxidizers can be added on-line by means such as a metering pump 5 placed between the iron filter 2 and sand filter 3 as shown in FIG. 1.

An arsenic filtration test was conducted by passing As-spiked tap water through a vibrating iron filter packed with 400 grams of iron filings. Arsenic solutions containing 150 mg/L arsenic [100 mg/L As(V)+50 mg/L As(III)] and 20 mg/L As(V) were passed through the iron filter. As(V) concentration was reduced from 20 mg/L in the influent to approximately 0.3 mg/L in the filtered water (FIG. 2). When the influent arsenic concentration was 150 mg/L, the average arsenic concentration in the filtered water was 12 mg/L. The results indicated that if two iron filters are used in series arsenic concentration can be reduced from very high concentrations to trace levels. The efficiency of the iron filter can also be improved by increasing the retention time of water in the iron bed.

The ability of the device of the present invention to process contaminated water was demonstrates in water spiked with chromate ions (1000 $\mu$g/L of Cr (VI)). Cr(VI) concentration was reduced to approximately 20 $\mu$g/L by the iron column. The sand filter further reduced Cr concentration to less than 3 $\mu$g/L. After 27 days of treatment, the flow rate was increased from 0.34 gpm/ft$^2$ to 2.7 gpm/ft$^2$. The effluent Cr concentration increased slightly to approximately 5 $\mu$g/L. Cr(VI) was effectively removed at a similar flow rate to the conventional sand filters.

The hydraulic retention time or the location of the iron injection port in the direct co-precipitation filtration process is determined by the rate of co-precipitation of contaminants with ferric hydroxide. The results show that removal of As(V) and iron is a function of time of co-precipitation. The mixed water was filtered through a 0.1 micron membrane filter to remove the co-precipitate. As(V) concentration was reduced from 50 $\mu$g/L in the influent to 3.3 $\mu$g/L within 1 minute of mixing. At the same time, iron concentrations were reduced from 1000 $\mu$g/L to 50 $\mu$g/L. Data showed that less than 10 minutes was required for the removal of As(V) by co-precipitation with ferric hydroxide with the device of the present invention.

In addition, results showed that removal of As(V) by the direct co-precipitation filtration process was an efficient means of water treatment. Using water with an As(V) concentration of 50 $\mu$g/L, ferric hydroxide solution was added in-line at a concentration of 1.0 ppm, prior to passage of water through the sand filter. The residual arsenic concentration in the filtered water was below 5 $\mu$g/L. During the filtration process there was no arsenic breakthrough and the pressure across the filter increased only gradually.

What is claimed is:

1. A water filtration apparatus, comprising
   at least one iron filter having a vessel and a bed of metallic iron particles within said vessel;
   at least one source of vibratory energy positioned so as to provide vibratory energy to said bed of metallic iron particles without rocking, rotating or oscillating said vessel; and
   a sand filter positioned downstream of said iron filter and hydraulically connected thereto.

2. The water filtration apparatus of claim 1, wherein said source of vibratory energy is external to said bed of metallic iron particles.

3. The water filtration apparatus of claim 1, wherein said source of vibratory energy is internal to said bed of metallic iron particles.

4. A water filtration apparatus, comprising
   at least one iron filter having a vessel and a bed of metallic iron particles within said vessel;
   at least one moveable auger which is in contact with said bed of metallic iron particles; and
   a sand filter positioned downstream of said iron filter and hydraulically connected thereto.

5. The water filtration apparatus of claim 4, further comprising a source of vibratory energy which is external to said bed of metallic iron particles.

6. A method for removing heavy metals and organic compounds from a dilute aqueous stream using a filtration apparatus having at least one iron filter containing metallic iron particles, said method comprising the steps of
   passing the dilute aqueous stream through the water filtration apparatus while applying vibratory energy to said metallic iron particles, thereby removing metals and organic compounds from the dilute aqueous stream so as to form an effluent; and
   passing the effluent through a sand filter positioned downstream of said iron filter.

7. A method for removing heavy metals and organic compounds from a dilute aqueous stream using a filtration apparatus having at least one iron filter containing metallic iron particles and at least one moveable auger inside of said at least one iron filter, said method comprising the steps of
   passing the dilute aqueous stream through the water filtration apparatus while moving said movable auger so as to agitate at least some of said metallic iron particles, thereby removing metals and organic compounds from the dilute aqueous stream so as to form an effluent; and passing the effluent through a sand filter positioned downstream of said iron filter.

8. The method of claim 6, wherein the step of applying vibratory energy is performed so that at least a portion of the metallic iron particles are vibrated in such a manner so as to scrub the surfaces thereof.

9. The method of claim 6, wherein said step of applying vibratory energy is performed intermittently.

10. The method of claim 6, further comprising the step of adding a coagulant into the effluent between said steps of passing the dilute aqueous stream through the water filtration apparatus of iron filter and passing the effluent through a sand filter.

11. The method of claim 6, wherein said vibratory energy is applied at a frequency in the range of about 20 Hertz to about 400 Hertz.

12. The method of claim 11, wherein said vibratory energy is applied at a frequency in the range of about 50 Hertz to about 200 Hertz.

13. The method of claim 12, wherein said vibratory energy is applied at a frequency of about 160 Hertz.

14. The water filtration apparatus of claim 1, wherein said bed of metallic iron particles is a packed bed.

15. The water filtration apparatus of claim 1, wherein the metallic iron particles have a mesh size in the range of about 40 mesh to about 200 mesh.

16. The water filtration apparatus of claim 15, wherein the metallic iron particles have a mesh size in the range of about 80 mesh to about 120 mesh.

17. The water filtration apparatus of claim 4, further comprising a source of vibratory energy which is attached to said moveable auger.

\* \* \* \* \*